US011738885B1

United States Patent
Chen et al.

(10) Patent No.: US 11,738,885 B1
(45) Date of Patent: Aug. 29, 2023

(54) MONITORING AND REPAIR METHOD FOR PLANETARY EXPLORATION PARACHUTE SYSTEM

(71) Applicant: SOOCHOW UNIVERSITY, Suzhou (CN)

(72) Inventors: Tao Chen, Suzhou (CN); Xuyan Hou, Suzhou (CN); Yongbin Wang, Yihuai (CN); Jiali Yu, Suzhou (CN); Lining Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/027,102

(22) PCT Filed: Oct. 24, 2022

(86) PCT No.: PCT/CN2022/126992
§ 371 (c)(1),
(2) Date: Mar. 18, 2023

(30) Foreign Application Priority Data

Mar. 26, 2022 (CN) .................. 202210308253.X

(51) Int. Cl.
*B64F 5/40* (2017.01)
*G01L 5/00* (2006.01)
*B64B 1/40* (2006.01)

(52) U.S. Cl.
CPC .............. *B64F 5/40* (2017.01); *G01L 5/0052* (2013.01); *B64B 1/40* (2013.01)

(58) Field of Classification Search
None
See application file for complete search history.

(56) References Cited

U.S. PATENT DOCUMENTS

| 7,040,580 B1 | 5/2006 | Cloth |
| 8,608,112 B1 | 12/2013 | Levay |

(Continued)

FOREIGN PATENT DOCUMENTS

| CN | 215361867 U | 12/2021 |
| CN | 114655444 A | 6/2022 |

(Continued)

OTHER PUBLICATIONS

Espacenet machine translation, Ji Wei, "Parachute Device Used in Emergency of Unmanned Aerial Vehicle," CN215361867U, Dec. 31, 2021 (Year: 2021).*

(Continued)

*Primary Examiner* — Michael J Dalbo
*Assistant Examiner* — Denise R Karavias
(74) *Attorney, Agent, or Firm* — SZDC Law P.C.

(57) ABSTRACT

An embodiment of the present invention discloses a monitoring and repair method for a planetary exploration parachute system. The monitoring and repair method includes: sensing an impact force of dust and generating a sensing signal by a sensor; receiving the sensing signal by an electrode in a fuse; and when the sensing signal is greater than a preset threshold, fusing a safety wire in the fuse; after the safety wire is fused, changing a spring in the fuse from a compressed state to a natural state to generate tension; and rotating a repair rod under an action of the tension to drive a folding piece to be changed into an unfolded state from a folded state, thus realizing precise evaluation of impact damage of dust particles to a parachute body, closed-loop control and real-time self-repair.

8 Claims, 4 Drawing Sheets

(56) References Cited

U.S. PATENT DOCUMENTS 10,071,810 B1 * 9/2018 Langner ................ F42B 33/067
2003/0197095 A1 10/2003 Preston

FOREIGN PATENT DOCUMENTS

CN 114671030 A 6/2022
CN 114777975 A 7/2022
CN 217304227 U 8/2022

OTHER PUBLICATIONS

Espacenet machine translation, Shi Fei et al., "Frame-Combinable Parachute Structure Capable of Being Repaired Under Complex Meteorological High-Altitude Conditions for Airborne Troops and Method," CN111516883A, Aug. 11, 2020 (Year: 2020).*

* cited by examiner

MONITORING AND REPAIR METHOD FOR PLANETARY EXPLORATION PARACHUTE SYSTEM

This application is the National Stage Application of PCT/CN2022/126992, filed on Oct. 24, 2022, which claims priority to Chinese Patent Application No. 202210308253.X, filed on Mar. 26, 2022, which is incorporated by reference for all purposes as if fully set forth herein.

FIELD OF THE DISCLOSURE

The present invention relates to the field of near-earth exploration technologies, and particularly to a monitoring and repair method for a planetary exploration parachute system.

BACKGROUND OF THE DISCLOSURE

In recent years, near-earth exploration becomes a popular exploration task. Since a planetary atmospheric environment has characteristics of dryness and a large diurnal temperature variation, extreme weather, such as a sand storm, or the like, often exists near the ground surface. Under an action of a strong wind, dry and loose planetary surface soil particles may rise to several kilometers or even dozens of kilometers, and dense dust aerosol is formed on the planetary surface. In a near-earth planetary exploration process, dust particles moving at a high speed may randomly impact a surface of a parachute of a probe to damage a structure of a parachute body, thus seriously threatening safety of the parachute.

Therefore, in view of the above technical problem, it is necessary to provide a monitoring and repair method for a planetary exploration parachute system, which can simultaneously realize monitoring of an impact strength of the dust particles and self-repair of damage caused by dust impact.

SUMMARY OF THE DISCLOSURE

In view of this, in order to solve the above problem, an object of an embodiment of the present invention is to provide a monitoring and repair method for a planetary exploration parachute system.

A monitoring and repair method for a planetary exploration parachute system, wherein the parachute system comprises a sensor and a repair structure, the repair structure comprises a connector, a repair rod, a folding piece, and a fuse, and the monitoring and repair method comprises:
  sensing an impact force of dust and generating a sensing signal by the sensor;
  receiving the sensing signal by an electrode in the fuse; and
  when the sensing signal is greater than a preset threshold, fusing a safety wire in the fuse; after the safety wire is fused, changing a spring in the fuse from a compressed state to a natural state to generate tension; rotating the repair rod under an action of the tension to drive the folding piece to be changed into an unfolded state from a folded state.

In the monitoring and repair method for a planetary exploration parachute system according to the embodiment of the present invention, the sensing signal for reflecting an impact strength of the dust particles is acquired by the sensor, thus precisely evaluating impact damage of the dust particles to the parachute body; the damage of the dust impact to the parachute is automatically repaired by the repair structure based on the sensing signal, thus realizing closed-loop control and real-time self-repair.

REFERENCE NUMERALS

Figure 1:
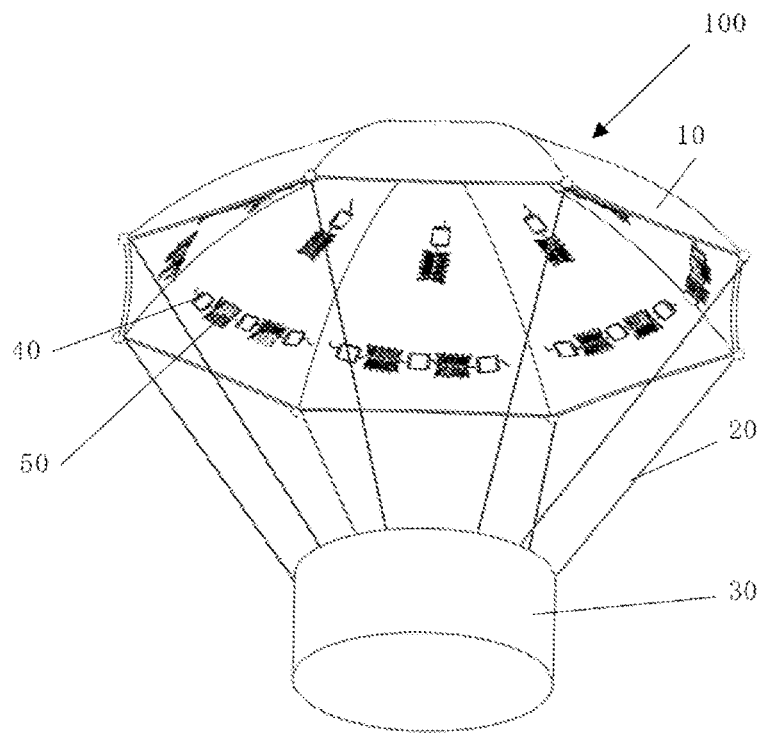
FIG. 1 is a perspective structural view of a parachute system for planetary exploration in an embodiment of the present invention.

100. Parachute system for planetary 10. Parachute body 20. Connecting exploration portion 30. Landing portion 40(40'). Sensor 50(50'). Repair 544. Safety wire structure 543. Electrode 542. Spring 41(513). Wire 43. First electrode plate 46. Second electrode 42. Insulating layer 44. First fabric layer 45. Second fabric plate layer 51. Connector 53. Folding piece 52. Repair rod 54. Fuse 511. Pin shaft 512. Insulating layer 521. Through hole 523. Through part 541. Protective sleeve

DETAILED DESCRIPTION OF PREFERRED EMBODIMENTS

Figure 4:
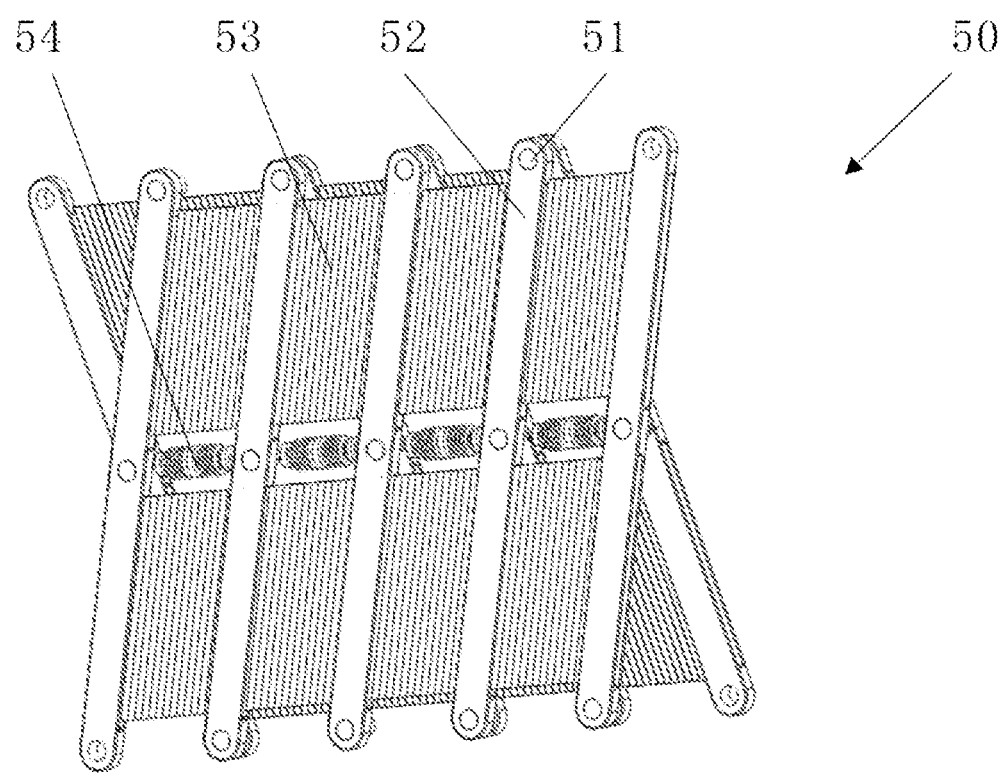
FIG. 4 is a schematic perspective structural diagram of a repair structure in an embodiment of the present invention.

FIG. 1 shows a schematic perspective structural diagram of a parachute system for planetary exploration in an embodiment of the present invention. A monitoring and repair method for a planetary exploration parachute system according to the present invention is applied to the parachute system. In this embodiment, the parachute system 100 for planetary exploration includes a parachute, a sensor 40 and a repair structure 50. The parachute includes a parachute body 10, a landing portion 30, and a connecting portion 20 for connecting the parachute body 10 and the landing portion 30. In a specific embodiment, the landing portion 30 is configured as a near-earth probe, and the connecting portion 20 is configured as a connecting cord. The sensor 40 is provided on the parachute body 10 and configured to detect an impact force of dust to generate a sensing signal. The repair structure 50 is provided on the parachute body 10 and electrically connected to the sensor 40, and the repair structure 50 performs a repair action based on the sensing signal generated by the sensor 40. As shown in FIG. 4, the repair structure 50 includes a connector 51, a repair rod 52, a folding piece 53, and a fuse 54.

In this embodiment, the parachute system 100 for planetary exploration has a simple structural design, and an overall structure has flexibility and high reliability.

Figure 2:
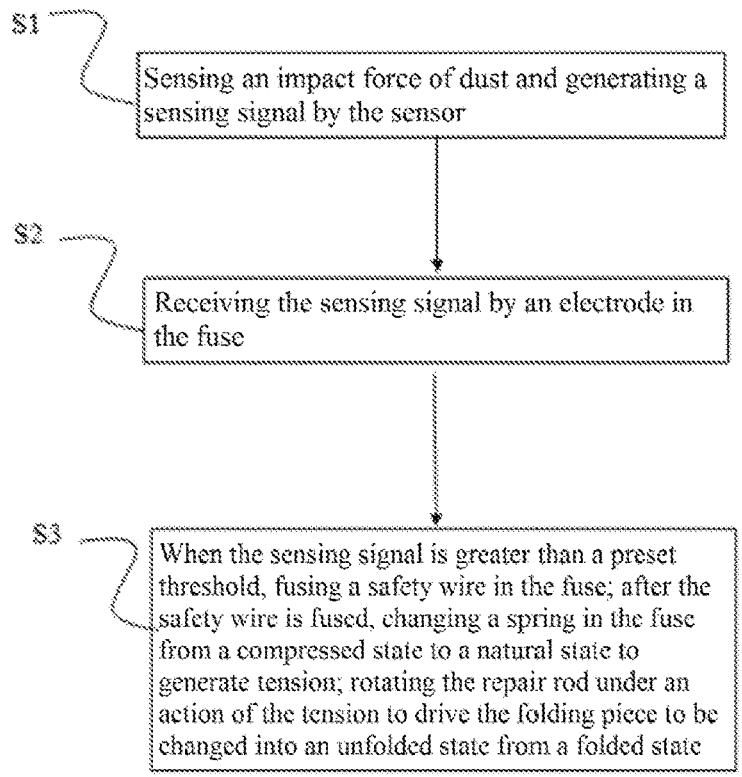
FIG. 2 is a schematic flow diagram of a monitoring and repair method for a planetary exploration parachute system according to an embodiment of the present invention.

FIG. 2 shows a schematic flow diagram of a monitoring and repair method for a planetary exploration parachute system according to an embodiment of the present invention. The monitoring and repair method for a planetary exploration parachute system includes three steps, and specifically, each step has the following content.

Step S1: sensing the impact force of the dust and generating the sensing signal by the sensor 40.

Figure 3:
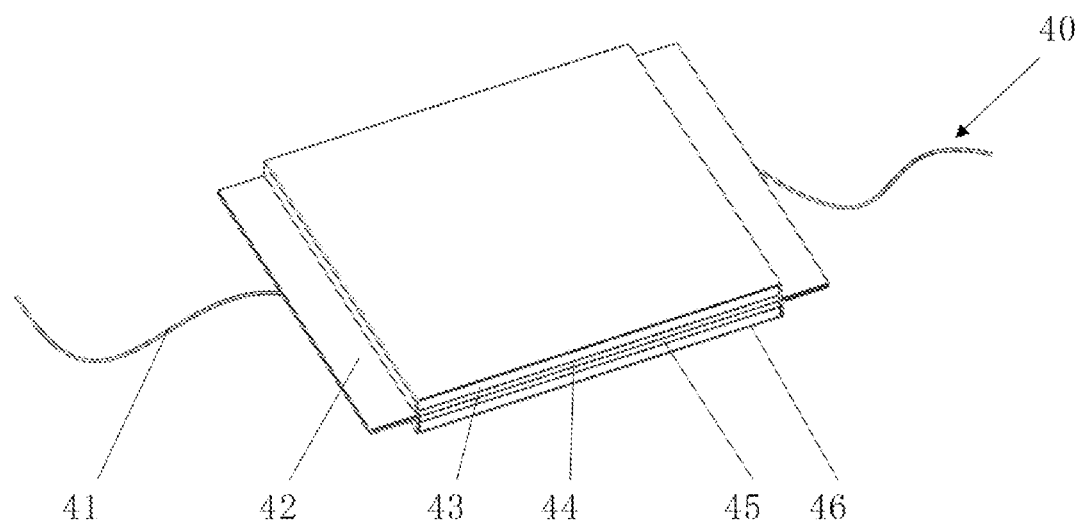
FIG. 3 is a schematic perspective structural diagram of a sensor in an embodiment of the present invention.

As shown in FIG. 3, in this embodiment, the sensor 40 includes a first electrode plate 43, a first fabric layer 44, an insulating layer 42, a second fabric layer 45, and a second electrode plate 46 which are arranged in sequence. The first electrode plate 43 or the second electrode plate 46 is configured to receive the impact of the dust, and electric polarities of the first fabric layer 44 and the second fabric layer 45 are opposite. Further, the sensor 40 further includes a wire 41, and the wire 41 passes through the insulating layer 42. The wire 41 conducts an electric signal generated by the sensor 40 after the dust impacts the first electrode plate 43 or the second electrode plate 46.

In this embodiment, the sensor 40 is configured as a friction electric sensor, and when an existing friction electric sensor is used for a precise exploration scenario, various detection circuits and control systems are required to be fitted. In this embodiment, due to the structural arrangement of the sensor 40, precise detection of the dust particles may be realized only by using the friction electric sensor alone in the parachute system, other circuits and power input are avoided, the structure is simple, and reliability is high.

The first electrode plate 43 and the second electrode plate 46 are made of metal materials; for example, aluminum foil electrodes are used as a positive electrode plate and a negative electrode plate of the sensor 40 respectively. The first fabric layer 44 and the second fabric layer 45 are made of tough non-metallic materials, and the first fabric layer 44 and the second fabric layer 45 have opposite electric polarities, high output voltages and certain flexibility. In a specific embodiment, the first fabric layer 44 is made of an aramid fabric and the second fabric layer 45 is made of a polyester fabric; or, the first fabric layer 44 is configured as a carbon fiber fabric layer and the second fabric layer 45 is configured as a jute fiber fabric layer. Preferably, a metal coating is attached to an inner surface 44 of the first fabric layer and/or an inner surface of the second fabric layer 45 to further improve electrode differentiation.

For the sake of a simple processing process and arrangement, preferably, a size of the first electrode plate 43, a size of the first fabric layer 44, a size of the second fabric layer 45, and a size of the second electrode plate 46 are kept consistent. A size of the insulating layer 42 is greater than the size of the first electrode plate 43, the size of the first fabric layer 44, the size of the second fabric layer 45 or the size of the second electrode plate 46.

Further, the sensor 40 further includes an insulating sealing layer (not shown) to better protect the sensor 40 and facilitate adhesion of the sensor 40 to a parachute body. The insulating sealing layer integrally seals the first electrode plate 43, the first fabric layer 44, the insulating layer 42, the second fabric layer 45 and the second electrode plate 46.

When the dust impacts the sensor 40 to generate the impact force, the first electrode plate 43 and the second electrode plate 46 of the sensor 40 are separated, opposite charges between surfaces of the first fabric layer 44 and the second fabric layer 45 are separated, and a potential difference is generated between the first electrode plate 43 and the second electrode plate 46; after the dust impacts the sensor 40 to generate the impact force, the first electrode plate 43 and the second electrode plate 46 are gradually closed from the separated state, such that the sensor 40 generates a pulse signal which is the sensing signal.

The first fabric layer 44 has a first thickness and the second fabric layer 45 has a second thickness. When the aramid fabric is used in the first fabric layer 44 and the polyester fabric is used in the second fabric layer 45, the thickness of the first fabric layer 44 is 20 micrometers and the thickness of the second fabric layer 45 is 50 micrometers. The thickness of the first fabric layer 44 and the thickness of the second fabric layer 45 are not exclusive. When thickness values are different, pulse voltage values generated by the sensor 40 are also different. Parameter settings of various components of the sensor 40 may be determined according to the following mathematical deduction.

A calculation formula of the impact force may be known from classical mechanics as follows:

$$F = \frac{mv}{\Delta t} \quad (1)$$

wherein F is the impact force of the dust particles, m is a mass of the dust particles, v is an impact speed of the mass of the dust particles, and $\Delta t$ is an impact time.

In the embodiment of the present invention, a parachute canopy fabric damage judgment model is set as follows:

$$d = \left(\frac{\varepsilon_{12}}{T_{12}}\right)^2 + \left(\frac{\varepsilon_{13}}{T_{13}}\right)^2 + \left(\frac{\varepsilon_{23}}{T_{23}}\right)^2 \quad (2)$$

wherein d is a parachute canopy damage value, $\varepsilon_{12}$, $\varepsilon_{13}$ and $\varepsilon_{23}$ are shearing forces applied to three orthogonal planes of the fabric respectively, and $T_{12}$, $T_{13}$ and $T_{23}$ are corresponding shearing strengths, as shown below.

$$\varepsilon_{23} = \frac{F}{S} \quad (3)$$

$$\varepsilon_{12} = \frac{F}{D * l_1} \quad (4)$$

$$\varepsilon_{13} = \frac{F}{D * l_2} \quad (5)$$

wherein S is a cross-sectional area of a single fiber bundle of the fiber fabric, $l_1$ and $l_2$ are a length and a width of a parallelogram unit cell of the fiber fabric respectively, and D is a diameter of the single fiber bundle of the fiber fabric. Therefore, $$d = \left(\frac{F}{S * T_{12}}\right)^2 + \left(\frac{F}{D * l_1 * T_{13}}\right)^2 + \left(\frac{F}{D * l_2 * T_{23}}\right)^2 \quad (6)$$

According to research statistics, a size and shape of the dust particle are positively correlated to the impact force. On a premise of a fixed mass, the larger the size of the dust particle is, the more serious the impact damage is; the larger a discrete degree of section sizes of the particles is, the more serious the impact damage is; for this reason, parachute damage judgment is corrected as follows:

$$d = \left[\left(\frac{mv}{\Delta t * S * T_{12}}\right)^2 + \left(\frac{mv}{\Delta t * D * l_1 * T_{13}}\right)^2 + \left(\frac{mv}{\Delta t * D * l_2 * T_{23}}\right)^2\right] * x * y \quad (7)$$

wherein x is a dust particle size correction parameter, and y is a dust particle shape correction parameter.

From traditional mechanics, impact energy E is calculated as follows $$E = \frac{m * v^2}{2} \quad (8)$$

According to data of sand storms on different planet surfaces, an energy limit born by the parachute canopy can be evaluated.

The energy and a damage factor are unified to obtain $$d = \left[\left(\frac{1}{\Delta t * S * T_{12}}\right)^2 + \left(\frac{1}{\Delta t * D * l_1 * T_{13}}\right)^2 + \left(\frac{1}{\Delta t * D * l_2 * T_{23}}\right)^2\right] * x * y * 2 * m * E \quad (9)$$

In this specific embodiment, due to a difference in electronegativity between aramid of the first fabric layer 44 and polyester of the second fabric layer 45, in an initial state, a surface of the aramid fabric is negatively charged and a surface of the polyester fabric is positively charged. Since the positive and negative charges are in a close contact state, the entire sensor does not exhibit any electrical output in this initial state. When the parachute canopy is impacted by the dust particles near the earth surface, the positive electrode plate and the negative electrode plate of the sensor are separated, and meanwhile, the opposite charges on the surface of the aramid fabric and the surface of the polyester fabric are also separated, such that a potential difference exists between a positive electrode and a negative electrode of the sensor. When the dust particles impact a surface of the parachute, the impact energy is released, the positive electrode plate and the negative electrode plate are gradually closed, the sensor recovers to an original state, and in the process, the sensor generates a pulse voltage signal. Each pulse signal reflects a collision process between the dust and the parachute fabric, and the dust impact on the parachute can be estimated by detecting peaks and a number of the pulse signals.

The voltage of the sensor pulse signal and the dust impact energy have the following relationship:

$$V = k * E \quad (10)$$

wherein V is the peak of the sensor pulse signal, E is the dust impact energy, and k is a distance coefficient, and is related to surface atmospheric density according to experimental determination.

Further, $$d = \left[\left(\frac{1}{\Delta t * S * T_{12}}\right)^2 + \left(\frac{1}{\Delta t * D * l_1 * T_{13}}\right)^2 + \left(\frac{1}{\Delta t * D * l_2 * T_{23}}\right)^2\right] * \frac{2 * m * x * y * V}{k} \quad (11)$$

Thus, a relationship between the damage condition and the pulse signal of the sensor at a friction point is obtained.

According to statistics of the relevant data of the sand storms near the earth surfaces of different planets and the strength of the fabric material of the parachute canopy, a value range of the damage factor d of the parachute canopy in the planet near-earth exploration process can be calculated in conjunction with the formula (7), such that a critical damage electric signal threshold of the parachute canopy is determined, and electric signal input is provided for the electric excitation self-repair folding structure.

Step S2: receiving the sensing signal by an electrode in the fuse.

With continued reference to FIG. 4, the connector 51 is configured to fix the repair structure 50 to the parachute body 10 of the parachute. The folding piece 53 is configured to repair a damaged part of the parachute; the folding piece 53 has a folded state and an unfolded state, and an initial state of the folding piece 53 is the folded state. The connectors 51 are fixed to two ends of the repair rod 52 respectively, and the folding piece 53 is provided between the two repair rods 53. The fuse 54 is provided in the folding piece 53, the fuse 54 is configured to receive the sensing signal generated by the sensor 40 and generate fusing when the sensing signal is greater than a preset threshold, and the folding piece 53 is changed from the folded state to the unfolded state after the fusing is generated in the fuse 54.

Figure 5:
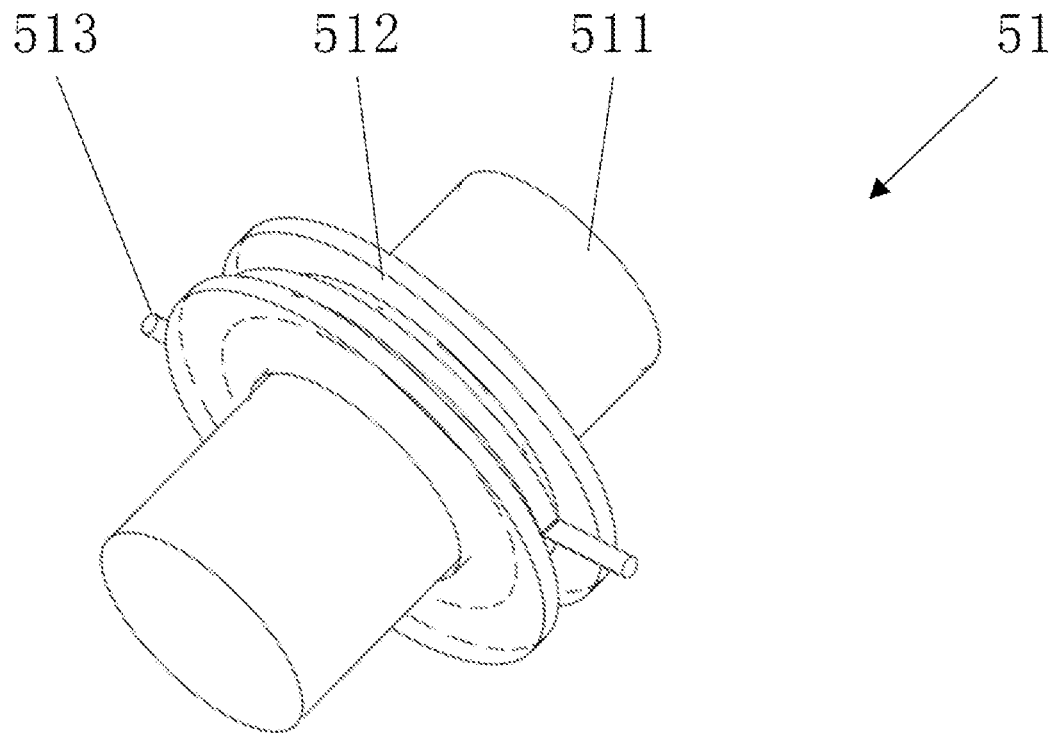
FIG. 5 is a schematic perspective structural diagram of a connector of the repair structure in the embodiment shown in FIG. 4.

As shown in FIG. 5, in this embodiment, the connector 51 includes a pin shaft 511, an insulating sleeve 512, and a wire 513. The pin shaft 511 is configured to be fixed to the parachute body 10 of the parachute. The pin shaft 511 is sleeved with the insulating sleeve 512, and the insulating sleeve 512 is provided with a groove (not shown). The insulating sleeve 512 is made of a rubber material, and the groove is formed in a middle of the insulating sleeve to accommodate the wire 513. The wire 513 is provided in the groove, one end of the wire 513 is connected to the sensor 40 generating the sensing signal, and the other end of the wire 513 is connected to the fuse 54.

Step S3: when the sensing signal is greater than the preset threshold, fusing a safety wire in the fuse; after the safety wire is fused, changing a spring in the fuse from a compressed state to a natural state to generate tension; rotating the repair rod under an action of the tension to drive the folding piece to be changed into the unfolded state from the folded state. In this embodiment, factors influencing the preset threshold include dust parameters near the earth surface of the planet and the strength of the canopy material of the parachute in the parachute system. For a specific calculation method of the preset threshold, reference may be made to the formula (7) described above. A rated electric signal of the safety wire in the fuse is set based on the preset threshold. In a specific embodiment, the rated electric signal includes a rated current or a rated voltage.

Figure 6:
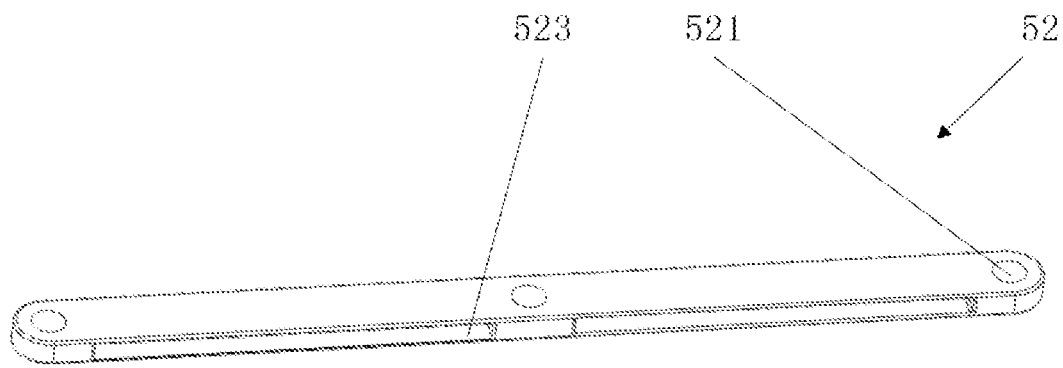
FIG. 6 is a schematic perspective structural diagram of a repair rod of the repair structure in the embodiment shown in FIG. 4.

As shown in FIG. 6, in this embodiment, each of the two ends of the repair rod 52 is provided with a through hole 521, and the connector 51 is inserted into the through hole 521. Specifically, a diameter of the pin shaft 511 is the same as a diameter of the through hole 521, and the pin shaft 511 and the through hole 521 are fitted with each other. A length of the pin shaft 511 is greater than a thickness of a body of the repair rod 52, and preferably, the length of the pin shaft 511 is three times the thickness of the body of the repair rod 52. A part of the body of the repair rod 52 is through and may be defined as a through part 523. The through part 523 is configured to store the folding piece 53. The repair rod 52 is flexible and can be made of a thermoplastic-based aramid fiber reinforced composite material, such that overall flexibility of the parachute is not affected.

The initial state of the folding piece 53 is the folded state, and a folded part is formed. After the fusing is generated in the fuse 54, the folding piece 53 automatically unfolds the folded part to repair the damaged part of the parachute body. Preferably, the folding piece 53 is made of a material consistent with a material of the canopy of the parachute, thereby enabling the repaired parachute to have consistency.

Figure 7:
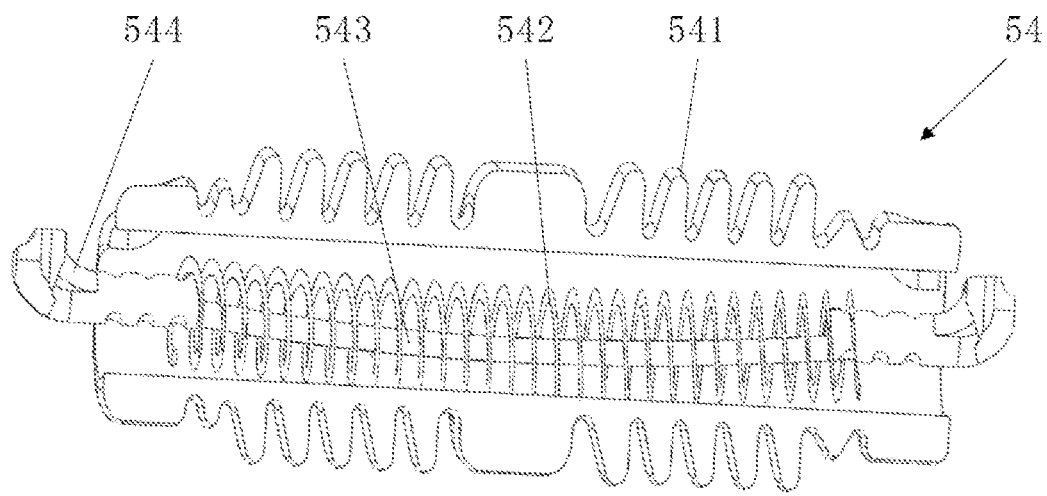
FIG. 7 is a schematic perspective structural diagram of a fuse of the repair structure in the embodiment shown in FIG. 4.

As shown in FIG. 7, the fuse 54 includes a protective sleeve 541, the spring 542, the safety wire 544, and the electrode 543. The protective sleeve 541 is made of an insulating material and has a hollow passage. The spring 542 is provided in the hollow passage; the spring 542 has the compressed state and the natural state, and an initial state of the spring 542 is the compressed state. Curvature of the spring 542 is consistent with curvature of the parachute body of the parachute, such that the repair structure can be flexibly unfolded in a repair process to be better consistent with the parachute body of the parachute. The safety wire 544 is inserted into the hollow passage of the spring 542. The electrode 543 is provided at an end of the safety wire 544 and electrically connected to the safety wire 544. Preferably, the safety wire is a fused-type safety wire. Curvature of the safety wire is consistent with the curvature of the parachute body of the parachute, such that the repair structure can be flexibly unfolded in the repair process to be better consistent with the parachute body of the parachute. When the parachute body is not impacted by the dust, the spring 542 is in the compressed state, and the spring 542 is restrained by the protective sleeve 541 and the safety wire 544.

In this embodiment, the repair structure 50 performs the repair action based on electrical excitation, and closed-loop real-time self-repair may be realized. Further, for the repair structure 50, a rated signal of the fuse may be set according to a specific planetary exploration task and conditions of the canopy of the parachute, a relevant preset threshold may be obtained, and different tasks and varying scenarios may be adapted.

According to the above formula (1), when the sensor 40 is impacted by the dust particles, the pulse voltage is generated. According to a performance test of the parachute, an impact energy threshold which can be borne by a parachute canopy structure in the near-earth space exploration can be obtained, and then, a pulse voltage threshold of the sensor 40 may be calculated. The rated voltages or rated currents of the safety wires used in different parachutes for near-earth surface exploration are determined according to the pulse voltage thresholds.

Figure 8:
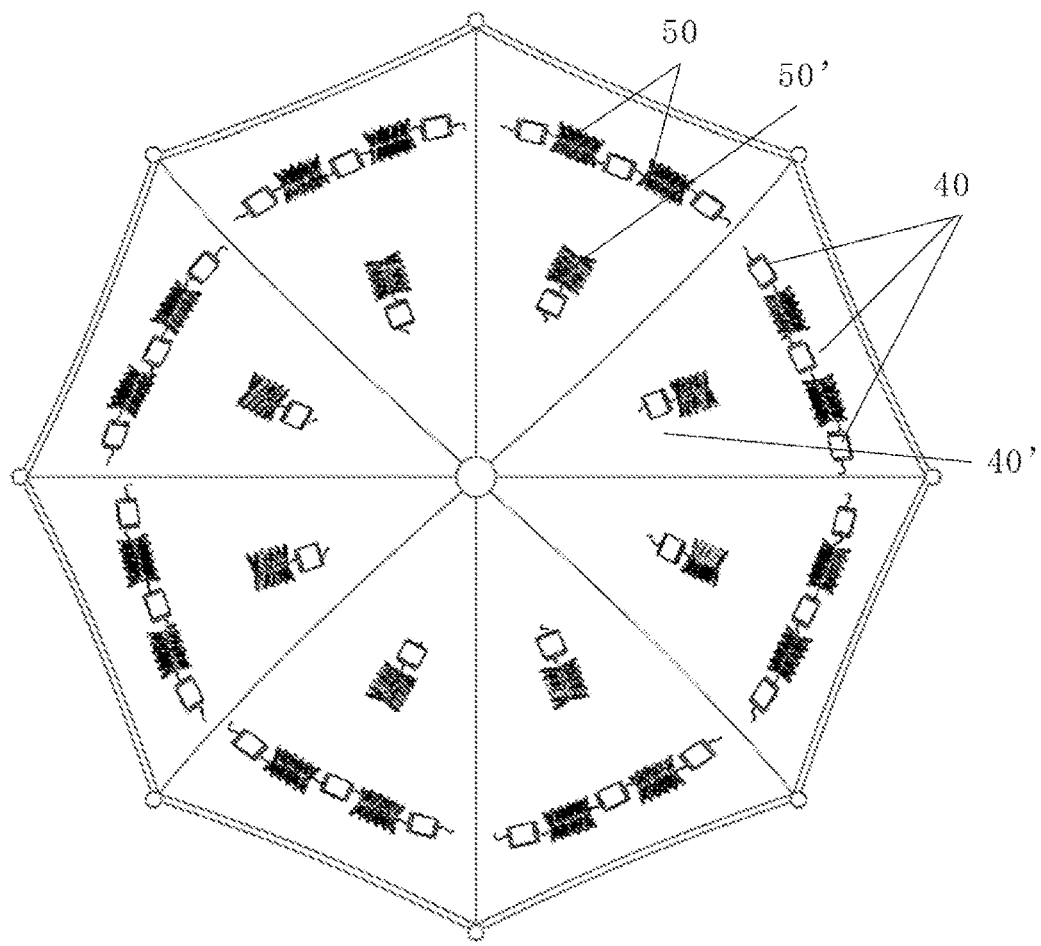
FIG. 8 is a schematic arrangement diagram of a repair structure and a sensor in various arrangements in an embodiment of the present invention.

As shown in FIG. 8, in this embodiment, the repair structure 50 has two arrangements including a circumferential arrangement on the parachute body of the parachute system and a radial arrangement on the parachute body of the parachute system. Herein, the circumferentially arranged repair structure is recorded as repair structure 50 and the radially arranged repair structure is labeled as 50'. Correspondingly, the sensor 40 has two arrangements including a circumferential arrangement on the parachute body of the parachute system and a radial arrangement on the parachute body of the parachute system. Herein, the circumferentially arranged sensor is labeled as sensor 40 and the radially arranged sensor is labeled as 40'.

Preferably, in order to realize reliable repair of different levels of damage, in the embodiment of the present invention, a quantitative design is performed on the rated current of the safety wire of the self-repair structure: the rated electric signal of the safety wire in the circumferentially arranged repair structure 50 is different from the rated electric signal of the safety wire in the radially arranged repair structure 50'. A specific calculation method is as follows:

for the circumferentially arranged self-repair structure, the rated current $I_1$ of the fuses at a left end and a right end is $$I_1 = \frac{0.9 * V}{R_1} \quad (12)$$

wherein V represents a critical electric signal peak, and $R_1$ is a resistance of the safety wire.

The rated current $I_2$ of the middle two safety wires is $$I_2 = \frac{V}{R_1 + R_0} \quad (13)$$

wherein $R_0$ is a resistance of the spring.

When the electric signal generated by the sensor reaches 90% of the threshold, the safety wires of the fuses at the left end and the right end of the self-repair structure are fused, and the repair structure is unfolded preliminarily to repair the damage. When the electric signal generated by the sensor reaches the threshold, the safety wires of the two fuses in the middle of the self-repair structure are fused, the repair structure is completely unfolded, and damage repair is realized.

For the radially arranged self-repair structure, the rated currents of the fuses from top to bottom are sequentially $$I_1 = \frac{0.9 * V}{R_1} \quad (12)$$

$$I_2 = \frac{0.9 * V}{R_1 + R_0} \quad (12)$$

$$I_3 = \frac{V}{R_1 + 2 * R_0} \quad (12)$$

$$I_4 = \frac{V}{R_1 + 3 * R_0} \quad (12)$$

When the electric signal generated by the sensor 40 reaches 90% of the preset threshold, the safety wires 544 of the two fuses 54 in the repair structure 50 are fused, and the repair structure 50 is unfolded preliminarily to repair the damage. When the electric signal generated by the sensor 40 reaches the threshold, the safety wires 544 of the fuses 54 in the repair structure 50 are fused, the repair structure 50 is completely unfolded, and damage repair is realized.

When the parachute is impacted by the dust to cause the canopy structure to be damaged, the sensor 40 generates the pulse voltage exceeding the preset threshold, the current is transmitted to the fuse 54 through the wire 41(513), the safety wire 544 in the fuse 54 is fused, and the spring 542 is released to generate transverse tension. Under an action of the spring 542, the repair rod 52 rotates around the connector 51, the folded part of the folding piece 53 is unfolded, and the canopy between connecting rods is also unfolded. The repair rods 52 guarantee the overall structural strength of the damaged parachute body of the parachute, and the folding piece 53 between the repair rods 52 can fill up a damaged hole of the canopy, thereby realizing the self-repair of the parachute.

In the monitoring and repair method for a planetary exploration parachute system according to the embodiment of the present invention, the sensing signal for reflecting the impact strength of the dust particles is acquired by the sensor, thus precisely evaluating impact damage of the dust particles to the parachute body; the damage of the dust impact to the parachute is automatically repaired by the repair structure based on the sensing signal, thus realizing closed-loop control and real-time self-repair.

It will be evident to those skilled in the art that the invention is not limited to the details of the foregoing illustrative embodiments, and that the present invention may be embodied in other specific forms without departing from the spirit or essential attributes thereof

What is claimed is:

1. A monitoring and repair method for a planetary exploration parachute system, wherein the parachute system comprises a sensor and a repair structure, the repair structure comprises a connector, a repair rod, a folding piece, and a fuse, and the monitoring and repair method comprises:
    sensing an impact force of dust and generating a sensing signal by the sensor;
    receiving the sensing signal by an electrode in the fuse; and
    when the sensing signal is greater than a preset threshold, fusing a safety wire in the fuse; after the safety wire is fused, changing a spring in the fuse from a compressed state to a natural state to generate tension; rotating the repair rod under an action of the tension to drive the folding piece to be changed into an unfolded state from a folded state.

2. The monitoring and repair method for a planetary exploration parachute system according to claim 1, wherein the sensing an impact force of dust and generating a sensing signal by the sensor comprises:
    when the dust impacts the sensor to generate the impact force, separating a first electrode plate of the sensor from a second electrode plate of the sensor, separating opposite charges between a surface of a first fabric layer of the sensor and a surface of a second fabric layer of the sensor, and generating a potential difference between the first electrode plate of the sensor and the second electrode plate of the sensor;
    after the dust impacts the sensor to generate the impact force, gradually closing the first electrode plate of the sensor and the second electrode plate of the sensor from the separated state, and generating a pulse signal by the sensor, the pulse signal being the sensing signal.

3. The monitoring and repair method for a planetary exploration parachute system according to claim 2, wherein factors influencing the preset threshold comprise dust parameters near the earth surface of a planet and a strength of a canopy material of a parachute in the parachute system.

4. The monitoring and repair method for a planetary exploration parachute system according to claim 3, wherein a calculation formula related to the preset threshold is as follows:

$$d = \left[\left(\frac{1}{\Delta t * S * T_{12}}\right)^2 + \left(\frac{1}{\Delta t * D * l_1 * T_{13}}\right)^2 + \left(\frac{1}{\Delta t * D * l_2 * T_{23}}\right)^2\right] * \frac{2 * m * x * y * V}{k},$$

wherein d is a value of damage of dust to a parachute canopy, S is a contact cross-sectional area of a single fiber bundle of a fiber fabric, m is a mass of the dust, V is a speed of the dust, $\Delta t$ is an impact time, $I_1$ is a length of a parallelogram unit cell of the fiber fabric, $I_2$ is a width of the parallelogram unit cell of the fiber fabric, $T_{12}$, $T_{13}$ and $T_{23}$ are shearing strengths on three orthogonal planes of the fiber fabric respectively, x is a dust particle size correction parameter, y is a dust particle shape correction parameter, V is a peak of the pulse signal generated by the sensor, E is dust impact energy, k is a distance coefficient, and D is a diameter of the single fiber bundle of the fiber fabric.

5. The monitoring and repair method for a planetary exploration parachute system according to claim 1, wherein a rated electric signal of the safety wire in the fuse is set based on the preset threshold.

6. The monitoring and repair method for a planetary exploration parachute system according to claim 5, wherein the repair structure has two arrangements comprising a circumferential arrangement on a parachute body of the parachute system and a radial arrangement on the parachute body of the parachute system.

7. The monitoring and repair method for a planetary exploration parachute system according to claim 6, wherein the rated electric signal of the safety wire in the circumferentially arranged repair structure is different from the rated electric signal of the safety wire in the radially arranged repair structure.

8. The monitoring and repair method for a planetary exploration parachute system according to claim 5, wherein the rated electric signal comprises a rated current or a rated voltage.

\* \* \* \* \*